E. MOEVIUS.
SUBJECTIVE SIGHT TESTING APPARATUS.
APPLICATION FILED DEC. 14, 1912.

1,187,763.

Patented June 20, 1916.
3 SHEETS—SHEET 1.

Witnesses
U. S. J. Dunbar
H. E. Bready

Inventor
Emil Moevius
by Percy ＿＿＿
atty.

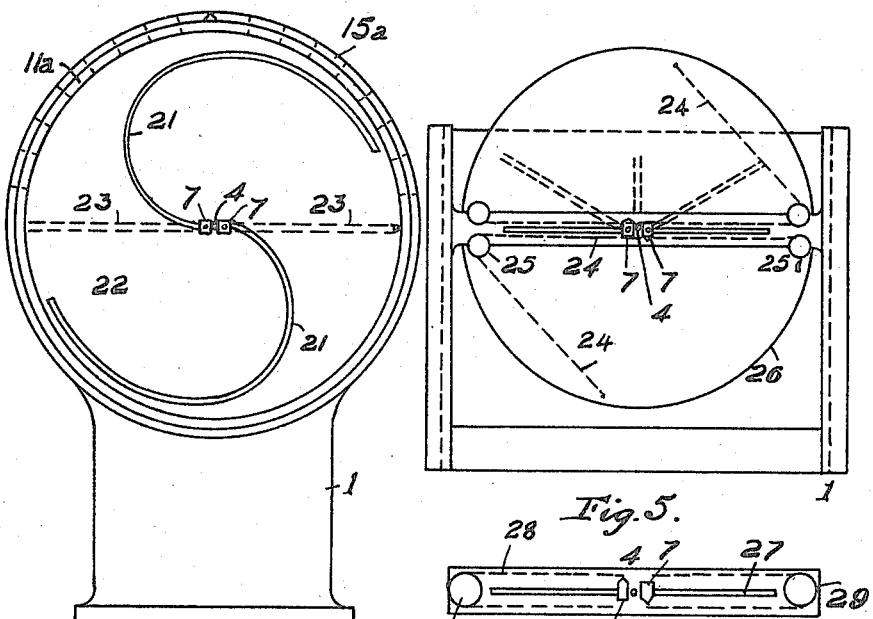
Fig. 4.
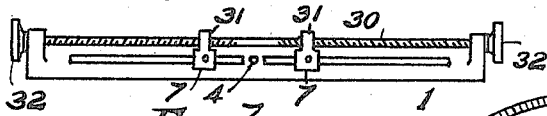
Fig. 5.
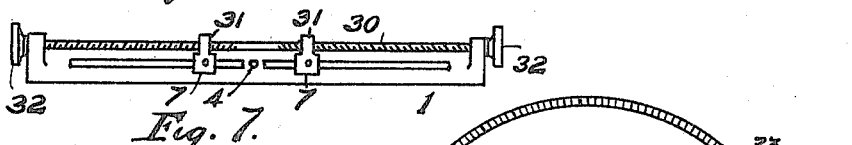
Fig. 6.
Fig. 7.
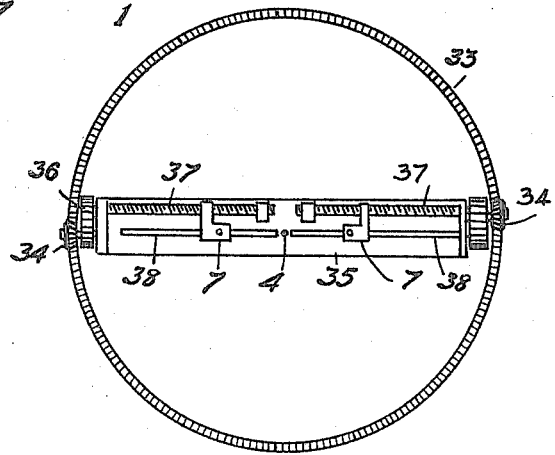
Fig. 8.

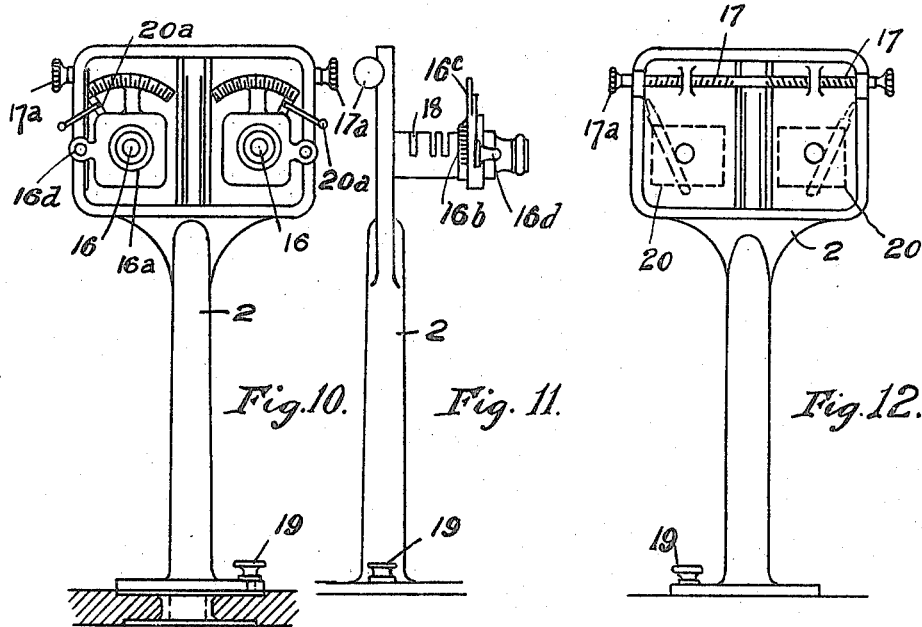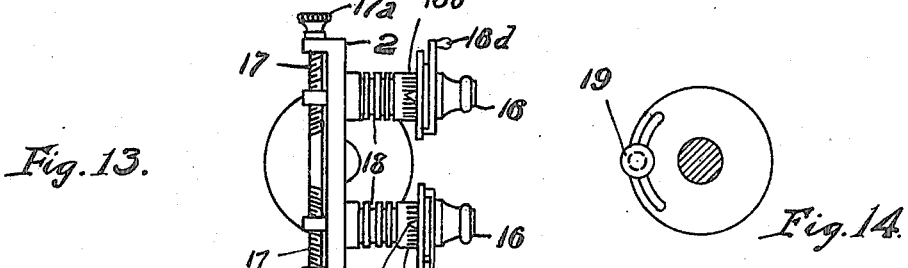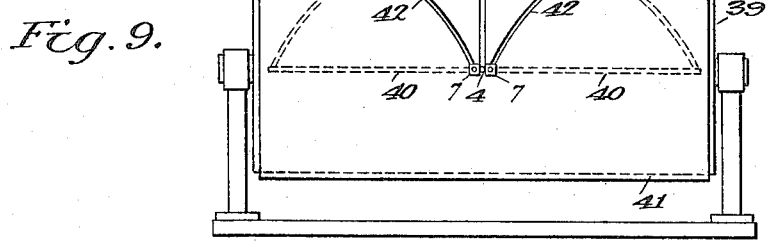

UNITED STATES PATENT OFFICE.

EMIL MOEVIUS, OF LIVERPOOL, ENGLAND.

SUBJECTIVE SIGHT-TESTING APPARATUS.

1,187,763.  Specification of Letters Patent.  Patented June 20, 1916.

Application filed December 14, 1912. Serial No. 736,676.

*To all whom it may concern:*

Be it known that I, EMIL MOEVIUS, a subject of the King of Great Britain, and a resident of Liverpool, England, have invented certain new and useful Improvements in Subjective Sight-Testing Apparatus, of which the following is a specification.

This invention relates to subjective sight-testing apparatus by means of which a number of tests can be made for the purpose of finding out the various possible defects in the eyesight of a patient, and the amount of those defects, so that the lenses required to correct the defects can be determined.

According to the present invention an apparatus is employed embodying preferably three small and circular apertures, one fixed centrally and the other two on either side of the central aperture and in a line. The central aperture is stationary but the outer apertures are movable, so as to be capable of being approached or receded simultaneously and equidistantly from the central aperture. This approaching or receding action may be done in a variety of ways, several of which are particularly described in the following specification. Means are provided for rotating the outer apertures radially about the central aperture, for measuring the angular position of the outer apertures, and their distances apart. The apertures are illumined and the light coming therefrom is viewed through a preferably binocular eyepiece. Both the eyepiece and the aperture device may be placed at a suitable opposing distance apart, or mounted on an adjustable stand side by side and a mirror provided to reflect the light from the aperture device to the binocular eyepiece.

Figure 1:
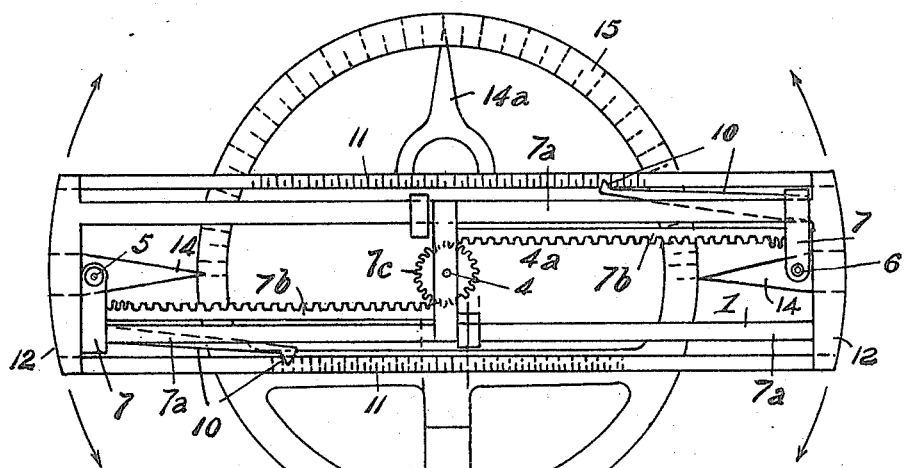
Figure 3:
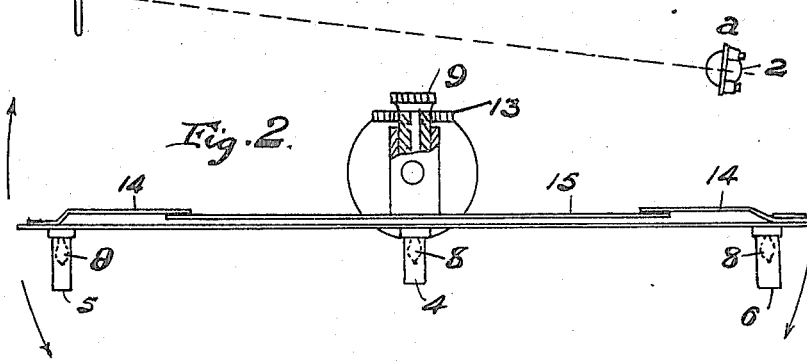
Figure 2:

The invention is illustrated in the accompanying drawings, in which,

Figure 1 is a front view of one form of apparatus carrying a fixed central and two outer movable apertures. Fig. 2 is a plan of Fig. 1, and Fig. 3 is a diagrammatic view showing the combination of the aperture device and binocular eyepiece with a mirror. Fig. 4 is a modified form of the device shown in Fig. 1, in which the position of the apertures is controlled by curved slots in a rotating disk operating with straight slots in a fixed disk. Fig. 5 is a further modification in which the position of the apertures is controlled by cords or the like connected to a disk and to sliding members. Figs. 6, 7, 8, and 9 show further modifications of this part of the invention. Fig. 10 is a front view, Fig. 11 a side view, Fig. 12 a rear view, and Fig. 13 a plan view of the binocular eyepiece. Fig. 14 is a fragmentary detail showing how the foot of the eyepiece is adjustable.

The invention comprises two main instruments, an illumined aperture device 1, such as Fig. 1, and a binocular eyepiece 2, Figs. 10, 11, and 12. These two parts of the instrument may be placed opposed a suitable distance from each other, such as twenty feet, or at a less distance when required, but for convenience in manipulating the instrument the two parts are mounted as shown in Fig. 3, side by side, and a mirror 3 to reflect the light coming from the apertures is placed at a distance of ten feet, or less, from the apparatus.

The device 1 has a number of apertures, a convenient number being three, as hereinafter explained, although any other suitable number may be used from two upward. The apertures are very small, so that when they are illumined the light passing through each of them appears at close range on the other side practically as a point of light. The apertures may be circular or of any other convenient shape, but apertures in the form of minute slits are preferred. The apertures may be illumined in any suitable way, but an electric lamp is the most convenient way. For the purpose of general sight-testing three small circular apertures, one 4 arranged at the center, and the other two 5 and 6 at equal distances from it on either side and in a line, are the most suitable. The central aperture is stationary in position, but the other two apertures may be formed in moving members 7 which can be moved toward or away from the central aperture 4.

In the arrangement shown in Fig. 1 the apertures are formed in the front of small cells containing miniature electric lamps 8. The members 7 are guided on bars 7ª, and connected to racks 7ᵇ operated simultaneously by a spur pinion 7ᶜ. The spur wheel 7ᶜ is rotated by a button 9 and the lamps and the outer apertures 5 and 6 are drawn together or separated to any desired adjustment. Pointers 10 carried from each of the members 7 are arranged to travel along graduated scales 11 upon which the radial distance of the apertures 5 and 6 may be read. The framework 12 carrying the graduated scales 11, racks 7ᵇ, pointers 10, and members 7 is rotatably mounted upon a central axis, the angular position of the framework 12 and consequently the apertures 5 and 6 being adjustable by the milled button 13. Pointers 14, 14ª, carried from the framework 12 are adapted to indicate on the circular graduated scale 15 the angular position of the apertures 5 and 6.

The eyepiece 2 is preferably binocular and each sighthole 16 will preferably have smoked or colored glass fitted in it in order to subdue the glare of the light through the aperture of the other part 1 of the instrument as reflected by the plane mirror 3 already mentioned. The sightholes in the eyepiece may be made adjustable by a right and left handed screw 17, Figs. 12, 13, operated by the milled nuts 17ª, the screw 17 engaging lugs or the like on the plates carrying the eyepieces in the frame 2, so that the eyepieces may be arranged to suit the pupilary distances apart of the eyes of different patients. The parts of the eyepieces 16ª for each eye may be made to turn separately, a scale 16ᵇ and pointer 16ᶜ being provided whereby the angular setting of the eyepiece may be read off after adjustment by the handle 16ᵈ. Slots 18 are provided in the stem of each eyepiece to receive the trial lenses, and the foot of the binocular eyepiece is revolubly mounted and fitted with a curved slotted locking mechanism 19 to enable the instrument to be adjusted for the correct angular position as shown in Fig. 3. Shutters 20 are provided for the eyepiece, preferably, one shutter for each sight hole, and adapted to be moved to and fro by handles 20ª across the sight holes at right angles to the pointer 16ᶜ attached to the eyepiece.

The use of the apparatus will be best explained by describing a set of tests to be made therewith. Firstly the three apertures 4, 5 and 6 of the device 1 may be exposed to form three points of light in a line, and these are arranged horizontally and in a plane at right angles to the principal or middle pointer 14ª. The patient is then asked to look with his right eye through the right sight hole a of the binocular Fig. 3, (the left sight hole being closed by the shutter if required) and to state what he sees. If the points of light appear elongated or as ovals, astigmatism is indicated; the direction of the astigmatism, i. e. the astigmatic meridian, is then determined by rotating the frame 12 and apertures 5 and 6 until the ovals or distortions of the points of light appear with their greatest lengths in line across the disk of the instrument. The pointers 14 attached to the frame 12 then indicate the astigmatic meridian on the scale 15 of the instrument. In order to determine the amount of ametropia the two outer apertures 5 and 6 of the three exposed in the device, are moved toward or away from the center until the ends of the ovals as seen by the patient appear just to touch one another, when the amount of ametropia may be read off on the scales 11 over which the pointers 10 move. While the apertures of the device remain in the position for this test, the kind of lens, whether convex or concave, is determined by revolving the eyepiece of the sight-hole until its pointer 16ᶜ is in the same position on its scale, as the middle pointer 14ª. The shutter 20 is then moved slowly across the sight-hole, and if the patient sees this as a shadow cutting off the light from the opposite direction to that in which the shutter is moved, hypermetropia is indicated, requiring a convex lens for its correction. If the light is cut off by a movement in the same direction as the shutter, myopia is indicated, requiring a concave lens for its correction.

In the case of astigmatism in two meridians, the second meridian is found by taking note of that secondary pointer 14 that happens to be on the graduated half arc of the scale 15 at the time of the first test, and the frame 12 turned around until the middle pointer 14ª is at the same position on the scale 15. The patient will now see the narrow parts of the three oval images or distortions side by side, and the two outer apertures 5 and 6 are moved together until the narrow parts of the distorted images appear to touch one another, thus giving the amount of ametropia in this direction, which may be read off on the scales 11 as before. The eyepiece is now turned around through 90 degrees and the shutter is used again to find out what kind of lens will be required to correct the ametropia of this meridian.

To measure the amplitude of accommodation of each eye, a sufficiently strong convex lens is placed into one eyepiece along with the correcting lens—if any, each eyepiece being closed by its shutter. The three apertures are now exposed, the two outer ones being moved away from the center. The patient is now asked to note position of distortions at the moment the shutter is withdrawn. If not touching each other the sight hole is again closed by the shutter and the apertures moved nearer to the center, when the shutter is again withdrawn, and this procedure is continued until the patient states the distortions are touching each other at the moment the shutter is withdrawn. The reading on the lens scale 11 obtained by this method is then compared with the reading obtained by leaving the sight-hole continuously open while moving the apertures until the images appear to touch—the difference between the two readings being the measure of the amplitude of the accommodation. The left eye is then subjected to a similar set of tests, and then in order to prove whether the lenses as indicated by the instrument are correct, the lenses as found by the tests may be placed in cells 18 provided to receive them in the eyepiece. Each eye is then tested separately the central aperture 4 only being used, and if the lenses have corrected the whole of the ametropia the point of light will appear as a perfectly round spot of light, the three apertures may be exposed and the two outer apertures moved until the spots of light touch one another when the pointer ought to be at the figure denoting normal vision.

In the form of the invention shown in Fig. 4, which is a modified arrangement of the device illustrated in Fig. 1, the moving members 7 containing the miniature lamps and forming the outer apertures corresponding to the apertures 5 and 6 of the previously described form, are caused to move radially inward or outward from the central aperture 4 by means of curved slots 21 formed in a rotatable disk 22. These curved slots 21 engage shanks or stalks on the sliding members 7 which are also engaged by radial slots 23 in a fixed plate. As the disk 22 is rotated, therefore, the coaction of the slots 21, 23, with the projections on the moving members 7, causes the apertures to be moved inward or outward, the amount of such radial movement being read off on the scale $11^a$, a secondary scale $15^a$ being provided for reading off the angular movement of the apertures, such angular movement being allowed for by enabling the disk 22 to be locked to the plate in which the slots 23 are cut and both disks rotated together after the radial adjustment has been made or otherwise.

In the arrangement shown in Fig. 5 the adjustable members 7 are moved radially and simultaneously by cords 24 passing over pulleys 25, the cords being secured to a disk 26 in such manner that rotation of the disk shall insure equal and simultaneous movement of the members, the disk being rotatably mounted about the fixed central aperture 4.

Fig. 6 shows an arrangement in which the adjustable members 7 are guided in slots 27 and coupled together by an endless cord 28 passing over pulleys 29. By operating one of the pulleys in any suitable manner the movable members 7 with their apertures may be adjusted with reference to the fixed aperture 4. Again in Fig. 7 a right and left handed screw 30 is arranged to engage lugs 31 on the movable members 7 carrying the outer apertures, the operation of the double threaded screw 30 by the nuts 32, controlling the inward or outward movement of the members 7 with reference to the central aperture 4.

In Fig. 8 a circular rack 33 is provided, engaged by the gearwheels 34 carried in the framework 35. The gear wheels 34 are coupled by gears 36, to screws 37, engaging the members 7, guided in slots 38. The rotation of the rack 33, therefore, operates to draw the members 7 together or separate them, with reference to the central aperture 4.

In the further modification shown in Fig. 9 a fixed central cylinder 39 is provided with straight slots 40 engaging shanks or projections on the movable members 7. An outer cylinder 41 rotatable on the cylinder 39, and in which opposite handed helical slots 42 are cut, operates on rotation in one or other direction to control the position of the members 7 with reference to the central aperture 4.

Tests for color blindness may be made by the use of colored glasses in the eyepiece or at the apertures through which the points of light pass. The instrument may be used as a phorometer for testing the balance of the eye muscles. This may be done by placing a double prism with the correcting lenses if any, in one eyepiece, the apparatus shown in Figs. 15 and 16 being then fitted over the central aperture 4 of the apparatus shown in Fig. 1 and the test carried out in the usual manner. The central aperture of course is alone used for this test, the yoke piece 43 being fitted over the cell $4^a$ in which the central aperture is formed, this yokepiece being provided with slots $43^a$ fitted with ground glass, and connected to a central orifice $43^b$, to take the place of the usual dot and dash diagram. Any other suitable testing appliances may be added to the instrument provided they do not interfere with the test already explained above, and if they are required to make the set of tests complete for any purpose.

Some modifications in the apparatus have been suggested already and it will be evident that various of the parts can be replaced by practically equivalent devices without altering the method of working to any considerable extent.

I claim:—

1. A subjective sight testing apparatus, comprising; a series of illumined apertures, disposed in line with reference to a central point, the outer points of the series being adjustable angularly and radially with reference to the central point, scales for the measurement of such angular and radial movement and an eyepiece axially rotatable to correspond with the angular adjustment of the points of light or the like.

2. A subjective sight testing apparatus, comprising, a rotatable frame, a series of illumined apertures or points of light carried thereby in line, means for simultaneously adjusting the radial position of the outer light points on the frame, means for angularly adjusting the frame, scales for indicating such radial and angular adjustment, a binocular eyepiece, rotatable lens cells in the eyepiece, and scales for setting the lens cells to any angular adjustment corresponding to that of the series of light points.

3. A subjective sight testing apparatus, comprising a rotatable frame, a series of illumined apertures or points of light carried therefrom in line, slidable means for simultaneously adjusting the radial position of the outer light point on the frame, a ratchet for actuating said means, means for angularly adjusting the frame, means for automatically designating radial and angular adjustment upon scales simultaneous with the effect of such adjustment, an eye piece, rotatable lens cells in the eye piece, and scales for setting the lens cells in any angular adjustment corresponding to that of the series of light points.

In testimony whereof I affix my signature in presence of two witnesses.

EMIL MOEVIUS.

Witnesses:
A. J. DAVIES,
B. E. KNIGHT.

Copies of this patent may be obtained for five cents each, by addressing the "Commissioner of Patents, Washington, D. C."